Sept. 2, 1930.  R. PETIT  1,774,843
TRANSMISSION MECHANISM
Filed Jan. 13, 1928   4 Sheets-Sheet 1
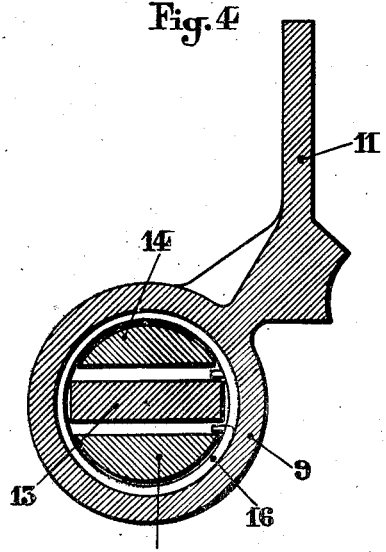
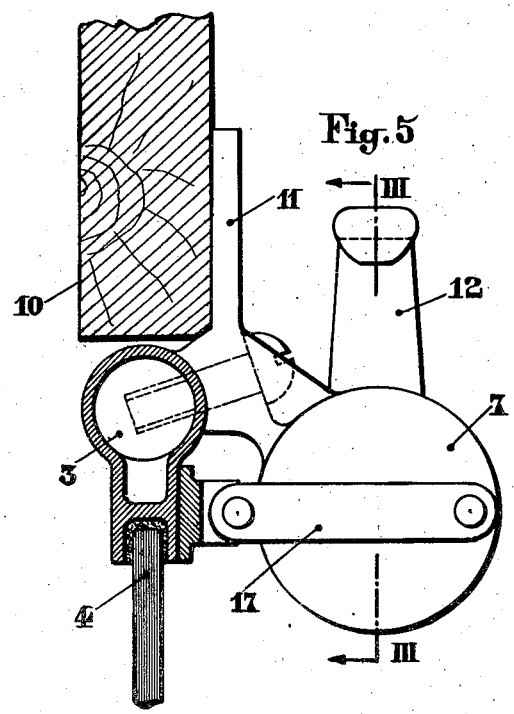
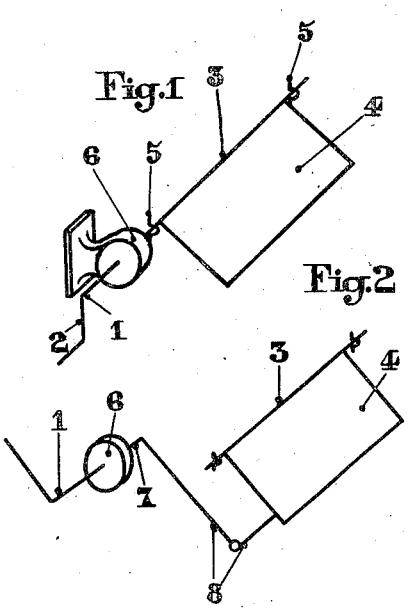
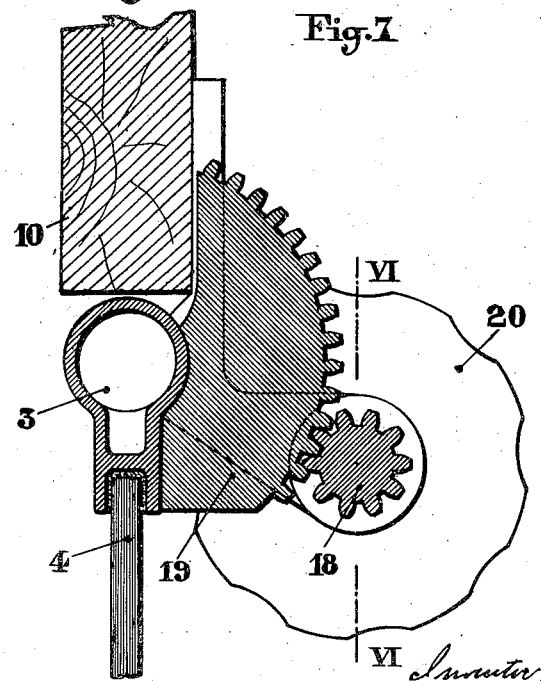

Sept. 2, 1930. R. PETIT 1,774,843
TRANSMISSION MECHANISM
Filed Jan. 13, 1928   4 Sheets-Sheet 2

Sept. 2, 1930.    R. PETIT    1,774,843
TRANSMISSION MECHANISM
Filed Jan. 13, 1928    4 Sheets-Sheet 3
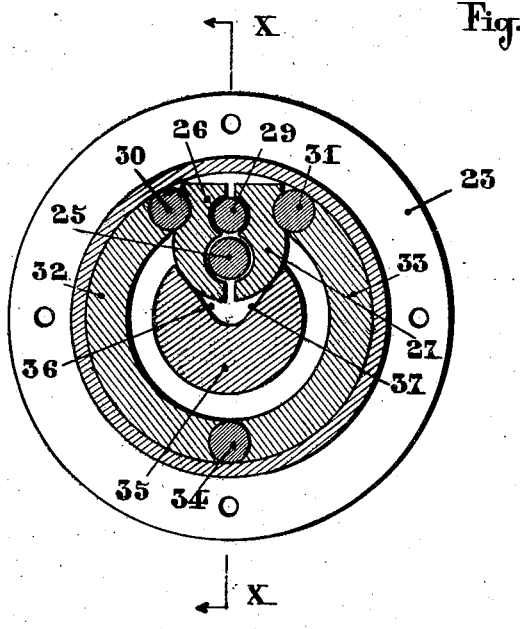
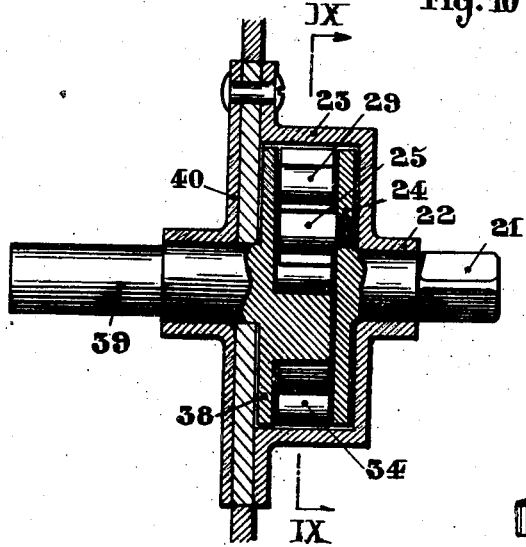
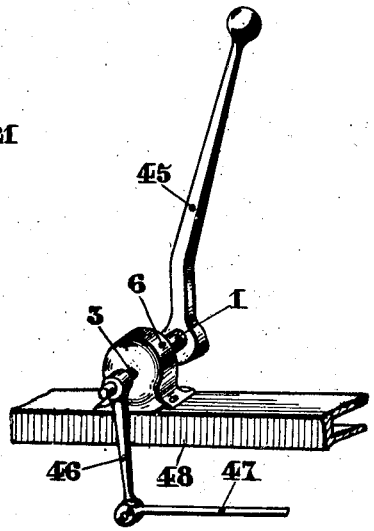

Sept. 2, 1930.  R. PETIT  1,774,843
TRANSMISSION MECHANISM
Filed Jan. 13, 1928  4 Sheets-Sheet 4
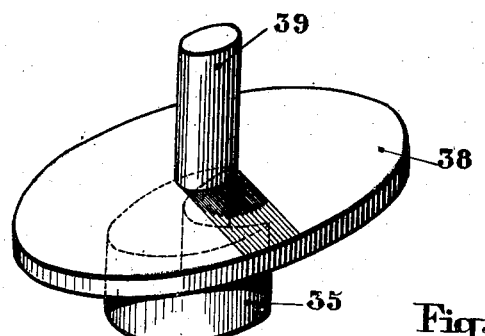
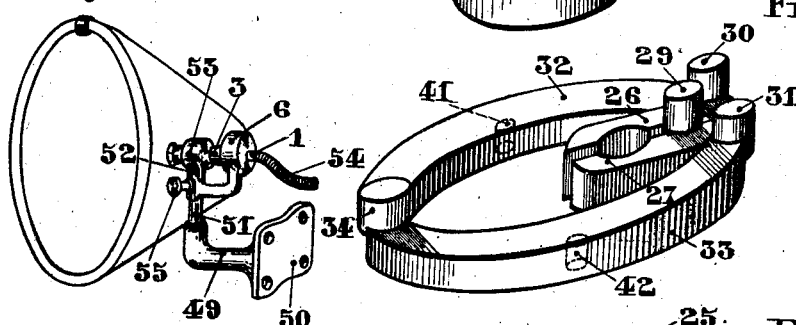
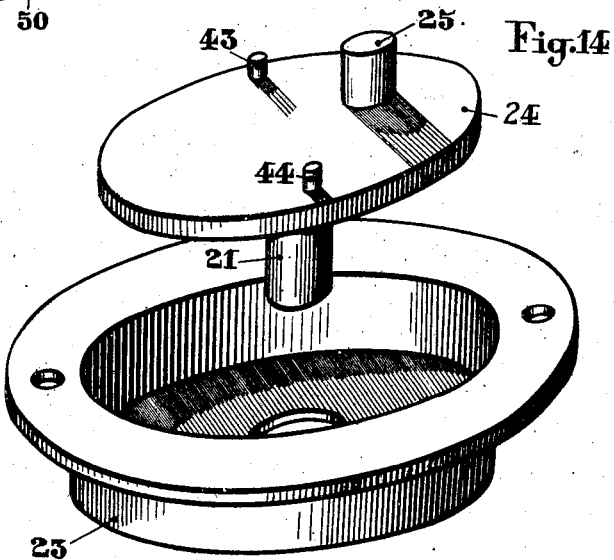

Patented Sept. 2, 1930

1,774,843

UNITED STATES PATENT OFFICE

RAYMOND PETIT, OF PARIS, FRANCE, ASSIGNOR TO SOCIÉTÉ ANONYME FRANÇAISE DITE: "BRICARD, ANCIENNE MAISON STERLIN," OF PARIS, FRANCE

TRANSMISSION MECHANISM

Application filed January 13, 1928, Serial No. 246,597, and in France April 11, 1927.

For the purpose of fixing in any angular position a panel oscillating around an axis on which it is pivoted, it is necessary to employ various mechanical means, either for maintaining the panel itself in the desired position or for making it integral with its axis of oscillation; the actual control of the angular movement of the said panel must therefore be followed by the manipulation or positioning of the fixing means, which requires time and may be prejudicial when for example the working of the windscreen or sun-shade of vehicles is involved.

For the purpose of effecting the one-way locking of the control of the angular movements of such panels, a device has been used comprising a worm acting on a pinion integral with the panel, but this device, although it ensures sufficient one-way locking, presents the disadvantage of requiring a long time for manipulation, when the angular movement controlled is considerable.

According to the present invention the method of controlling movements of pivoted panels consists in dispensing with the disadvantages above referred to by permitting the control of the angular movements of the said panels without high reduction gearing whilst ensuring the one-way locking of the system, by interposing on the transmission gear, between the working mechanism and the panel to be moved, any suitable apparatus so that the movements imparted to the working mechanism are directly transmitted to the panel controlled, but that the forces exerted on the panel itself are powerless to effect its angular displacement.

The present invention also has for its object an appliance enabling the process according to the invention to be carried into effect.

In the accompanying drawing:

Fig. 1 shows a perspective and diagrammatically the manner in which the process according to the invention may be carried into effect by a direct control of the rotation of the axis of oscillation with which the panel is integral.

Fig. 2 shows diagrammatically in perspective, the general embodiment of the process according to the invention, when the control acts on the panel itself and comprises interposed transmission gear.

Fig. 4 is a partial view in cross section on the line IV—IV of Fig. 3 of the same device.

Fig. 5 is a view in cross section on the line V—V of Fig. 3, of the same apparatus.

Fig. 7 is a cross section on the line VII—VII of Fig. 6, of the above mentioned control device.

Fig. 8 shows in perspective the method of applying the device according to the invention to the control of the brake gear of motor vehicles.

Figure 3:
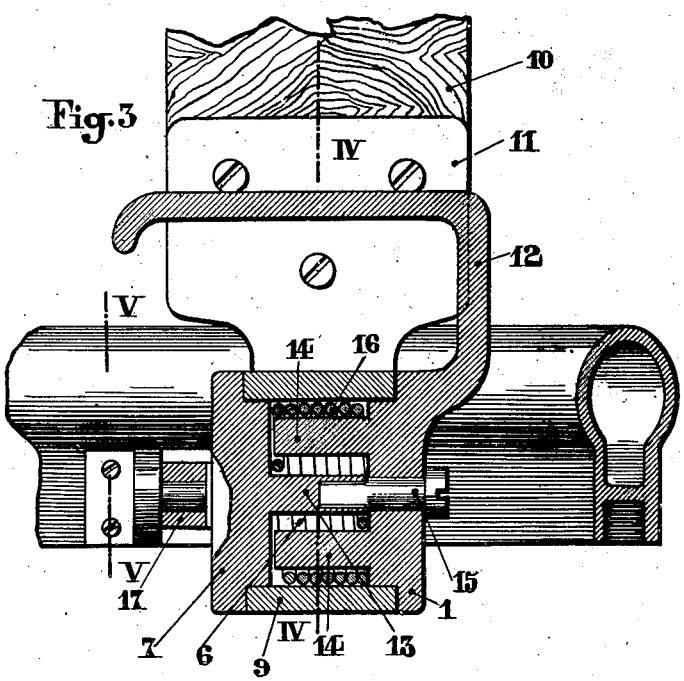
Fig. 3 is a longitudinal section on the line III—III of Fig. 5, of an embodiment of the one-way locking control device as applied to a wind screen.

Fig. $8^{bis}$ is a perspective view of the method of applying the transmission system according to the invention to the remote control of the angular movements of the lamps of vehicles.

Fig. 9 shows in section, on a plane perpendicular to the axis of rotation, on the line IX—IX of Fig. 10, a rotary mechanical device for one-way locking transmission in two directions.

Fig. 10 is a section through the axis of the same device, on the line X—X of Fig. 9.

Fig. 11 is a perspective view of an embodiment of the driven shaft.

Fig. 12 is also a perspective view of the whole of the locking mechanism of the device, the pivoting rollers being removed to enable the drawing to be more easily understood.

Fig. 13 shows the stationary box, on the walls of which the locking mechanism acts.

Finally Fig. 14 is a perspective view of an embodiment of the driving shaft.

As shown diagrammatically in Figs. 1 and 2, each device for carrying the method into effect, consists of two parts, a driving or primary part and a driven or secondary part, these two parts being connected by a one-way locking device formed in such a manner that it is adapted to transmit to the secondary the rotary movements which it receives from the primary, but opposes any rotatory movements of the secondary resulting from any force applied to the panel controlled.

In Fig. 1 the primary consists of a shaft 1 adapted to receive a rotary movement by means, for example, of the lever 2, and the secondary consists of the axis 3 of oscillation of the controlled panel 4, the said axis being adapted to revolve in bearings 5.

The system which is shown in Fig. 1 is applicable in the case where the one-way locking device 6 is inserted directly between the primary shaft 1 and the secondary shaft 3 which is the axis of oscillation of the panel 4, i. e. in this system, the angular movements of the controlled panel 4 are solely determined by the rotation of the shaft 3 with which the panel is integral.

The one-way locking device 6 being constructed in such a manner that it fulfills the conditions set forth above and being integral with a fixed part of the frame or chassis on which the system is mounted, it will be evident that by acting on the hand lever 2 in one direction or the other, angular movement of the panel will be produced, these angular movements being of the same amplitude and direction as those of the hand lever; it is likewise apparent that, all actions on the hand lever having ceased, the panel 4 will become immovable in the position which it has been given, any force applied thereto and tending to rotate same being nullified by a clamping action set up in the one-way locking device 6.

Fig. 2 shows diagrammatically an apparatus likewise enabling the object of the invention to be carried into effect, but which differs from that shown in Fig. 1 in that the primary shaft 1 does not act on the axis of oscillation 3 of the panel 4, but that the rotary movements of a secondary shaft 7 are transmitted to the panel by means of transmission gear for controlling the oscillations of the panel. This device may be specially applied in a large number of cases and the transmission gear, referred to above, may be of any kind.

The one-way locking device 6 must be characterized by the fact that the rotary movements, of any direction or amplitude imparted to the primary shaft produce rotations in the same direction and of the same amplitude of the secondary shaft, whilst the action of a couple, applied to one direction or the other, on the secondary shaft, effects no angular displacement whatever of either shaft; the device fulfilling these conditions therefore imparts absolute one-way locking to the drive, irrespective of the direction of the latter.

The embodiment of the invention shown in Figs. 3, 4, and 5 corresponds to the arrangement shown diagrammatically in Fig. 2, an intermediary coupling connecting the panel and the secondary.

In this embodiment, the one-way locking device 6 is located in a socket 9 fixed to the frame 10 of the wind-screen by means of a bracket, screwed on to the said wing screen and integral with the socket 9; the primary shaft 1 can be turned freely in the socket 9 by acting on the handle 12 and it imparts its rotary movement to the secondary shaft 7 by the drive of the tongue 13 engaging between the side walls 14 of a slot cut in the primary shaft. The spindle 15 holds the two shafts in engagement and its withdrawal enables the device to be dismantled; a spring 16 located between the socket 9 and the primary shaft and of which the ends are engaged between the two shafts (Fig. 4) prevents the reversing of the drive in the known manner by pressing against the internal walls of the socket.

The secondary shaft 7 is connected to the panel to be worked by means of a knuckle-jointed connecting rod 17.

It will be evident that such a device permits the control, by acting on the handle 12, of angular movements of the panel 4 round the axis of rotation 3, whilst no force applied in any direction on the panel 4 produces any angular movement of the main shaft, owing to the interposition of the one-way locking device; the one-way locking of the system is therefore perfectly ensured.

Figure 6:
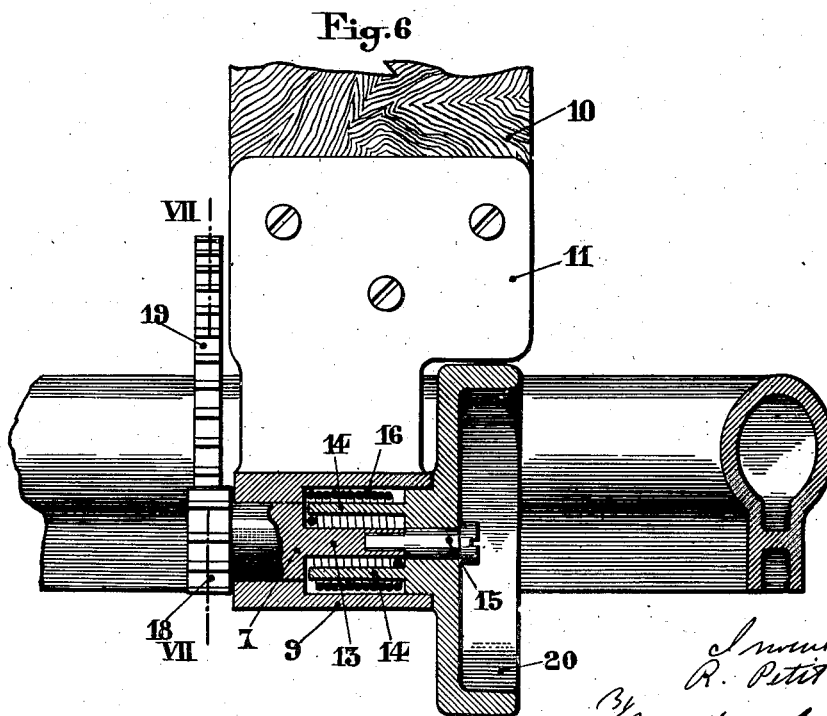
Fig. 6 is a longitudinal section on the line VI—VI of Fig. 7, of a second embodiment of the invention as applied to the control of wind-screens.

In the embodiment shown in Figs. 6 and 7, the general arrangement is the same but the transmission rod is replaced by a pinion 18, keyed onto the secondary shaft and in engagement with a toothed sector 19 integral with the panel 4 and adapted to turn round the same axis of oscillation; in this case the control handle for the rotation of the primary shaft is replaced by a button 20.

The embodiments which have just been described are only cited by way of example, and it is to be understood that the invention is in no way confined to them.

It should likewise be pointed out that in the embodiments described the actuating gear (handle, lever, fly-wheel, etc.) is directly fixed onto the primary shaft of the one-way locking device; it will be evident that in the case where it is desired to arrange for remote control of the wind-screen movements, the angular movements of the primary shaft can be produced by a relay of any kind or by means of a mechanical, pneumatic or electric coupling or the like.

It will be understood that the rotary one-way locking devices which are utilized in the various embodiments of the invention may be of any type, either known or new and will be chosen solely for their suitability in this connection, the invention residing not in the actual construction of these devices themselves, but in their special application to the control of oscillating panels.

As shown in Fig. 8 the irreversible transmission device according to the invention is likewise applicable to brake gear or motor vehicles. In this case, the operating lever 45 is made integral with the primary shaft 1 whose angular movements are transmitted directly to the driving member or crank arm 46 of the brake 47, integral with the secondary shaft 3, by means of the one-way locking device 6 inserted between the primary and the secondary shaft and fixed on a member 48 integral with the chassis of the vehicle.

The application of the transmission device to the control of brake gear enables the ratchet or like mechanism generally used for fixing the operating levers in all their angular positions, to be dispensed with, such mechanism necessitating a supplementary action on the part of the driver of the vehicle; a rotary one-way locking device being inserted between the operating lever and the control member of the brake gear, whereby the reactions of the brakes on the said gear cannot be transmitted to the lever 45.

As in the case of application to the operation of oscillating panels, it will be understood that the rotary one-way locking devices employed in the controlling of brakes, may be of any type, known or new, the invention residing, not in the actual arrangement of these devices themselves, but in their special application to the working of the oscillating panels. However, in the majority of cases it will be found preferable to use as this transmission gear one of the devices constituting the object of this invention and which is shown in Figs. 9, 10, 11, 12, 13 and 14, which, consisting only of rigid members, offers greater solidity and greater precision in working than those devices which comprise resilient parts such as springs.

Fig. 8$^{bis}$ which refers to the application of the method of irreversible transmission, the object of this invention, to the remote control of the movements of vehicle lamps, shows a special embodiment of this application.

In this case the lamp bracket 49 fixed, for example, to any integral part of the chassis by a fixing plate 50, carries an upright rod 51 on which may rotate a socket 52 integral with the bearings 53 of the counter-shaft 3, fixed to the body of the lamp.

A rotary one-way locking device 6, integral with the socket 52 is inserted between the counter-shaft 3 and the primary shaft 1, the rotation of the latter being controllable by a flexible shaft 54 or by any other suitable member.

The movements of the lamp in the horizontal plane are effected by rotation of the socket 52 on the rod 51, the said socket being adapted to be fixed on the rod by tightening the screw 55. The movements of the lamp in the vertical plane may be controlled from the driver's seat by acting on the flexible shaft 54, thereby producing the rotation in the required direction of the primary shaft 1 and in consequence that of the secondary shaft 3 integral with the lamp.

It is evident that any movements in the vertical plane which the vibrations or the movements of the chassis might tend to impart to the lamp will be prevented by the one-way locking device.

As in the case of the preceding applications the rotary one-way locking devices which are adopted in lamp movement control may be of any known or new type, the invention residing in the application of these devices to this control which may be carried out not only in the vertical plane but also in any other desired plane. At any rate the device shown on Figures 9, 10, 11, 12, 13 and 14 may be chosen.

In the modification of the construction of the irreversible transmission shown in Figures 9 to 14, the drive shaft 21 revolves in a bearing 22 carried by a box 23 fixed with respect to a fixed part of the machine, engine, vehicle, etc. to which the construction in question is to be applied; the shaft 21 is fixed to a crank plate or crank 24.

The tenon 25 engages in a housing provided between the two levers 26 and 27 and is suitably shaped for this purpose; these two levers pivot on a common free trunnion 29 and are separated by a sufficient distance to enable them to oscillate slightly on the said trunnion.

At their ends nearest to the inner wall of the box and at their faces opposed to that on which the trunnion 29 bears, the levers 26 and 27 pivot respectively on free trunnions 30 and 31, on which rest, on the other hand, the free segments 32 and 33 the outer cylindrical curvature of which is the same as that of the interior walls of the box 23 and which pivot, at their other end on the free trunnion 34.

The centres of the three trunnions 29, 30 and 31 form the vertices of an isosceles triangle of which the apex 29 is located between the axis of rotation of the device and the line which joins the centres of the trunnions 30 and 31.

In the hollow central space present between the segments 32 and 33 and the levers 26 and 27 is located the sector 35 having a slot of which the sides 36 and 37 enclose the levers 26 and 27 but permit a slight separation of these levers; the sector 35 is fixed on a plate 38 which bears normally on the segments 32 and 33 and which can turn freely in the box 23 and which is integral with the driven shaft 39.

The shaft 39 is carried in a bearing mounted on a rigid part of the device support, for example the plate 40.

The axes of the two shafts 21 and 39 are in line.

It will be noticed that the different pieces which constitute the locking gear (levers 26 and 27, trunnions 29, 30, 31 and 34, segments 32 and 33) are independent both of the shaft 21 and the shaft 39 and that the action of the said shafts on the locking gear can only be effected by the tenon 25 (for the shaft 21) and by the planes 36 and 37 (for the shaft 39) these acting respectively for separating and drawing together the free ends of the levers 26 and 27, irrespectively of the direction of rotation.

When an angular movement is imparted to the driving shaft 21 in one or the other direction, the tenon 25, acting on one or other of the levers 26 and 27, and being between these levers, separates the lower arms which causes, by oscillation on the trunnion 29, the upper arms to be drawn together and the separation of the segments from the inner walls of the box 23; the locking gear can then turn freely in the box and carry with it the driven shaft 39 by the action of one of the levers 26 or 27 on one of the sides 36 or 37 of the slot in the sector 35.

On the other hand, if a couple is applied to the shaft 39 to effect its rotation in one direction or the other, one of the sides 36 or 37 bears outwardly on the lever corresponding thereto and causes the deformation of the triangle 29, 30 and 31 and the separation of the two trunnions 30 and 31 which tightly press the segments 32 and 33 against the inner wall of the box 23 thereby preventing any rotation of the locking gear and, in consequence, of the shafts 21 and 39 integral in rotation with this gear through the tenon 25 and the sector 35.

The segments 32 and 33 carry, on the side where they contact with the plate 24, grooves 41 and 42 of any suitable section in which engage the tenons 43 and 44, integral with the plate 24, the dimensions of these tenons being such that whilst permitting the necessary movements of the segments, they limit the relative movements of the locking mechanism and the carrier plate and provide for the carrying along of the segments in the general rotary movement, as soon as the unlocking has been effected. The same device or a similar device may be applied in apparatus adapted to rotate at high speed, to counteract the effect of centrifugal forces acting on the segments.

The device according to the invention therefore forms a one-way locking control system, as any reaction tending to produce rotation of the driven shaft in either direction, if it is not balanced by a corresponding force on the driving shaft, causes the locking of the device, which locking is the more pronounced the greater the force applied to the driven shaft.

The device according to the invention may therefore be applied to all mechanisms in which it is desired to control certain movements of these mechanisms without it being possible for the elements controlled to react on the control itself. For instance such a device may be adapted to apparatus intended to move windows in one direction, in steering gear, brakes, speed gears of motor vehicles or air craft, clutches of machines, hoisting appliances, sighting apparatus of ordnance and in machine tools in general, this enumeration being, however, merely by way of indication and in no way limitative. Finally it will be understood that modifications in the dimensions and in the respective connections of the various elements may be made in the device according to the invention without effecting its characteristic features.

The present invention has for its object:—

1. Irreversible bi-directional transmission device comprising a fixed casing having an interior cylindrical bearing surface, a driving shaft journalled in one end of said casing, coaxially with said bearing surface, a plate on said driving shaft within said casing, a pair of segments loosely mounted on said plate having exterior faces with a curvature corresponding to that of said bearing surface, said segments being relatively hingedly movable at one pair of their adjacent ends, and of such length as to leave a gap between their remaining ends, the ends of said segments at said gap being normally symmetrical with respect to a diameter passing through the axis of said driving shaft and the axis of the hinge movement between said segments, a pair of levers also arranged symmetrically with respect to said diameter and hingedly movable relative to the ends of said segments adjacent said gap, a free trunnion embraced between said levers having its axis normally lying on that side of the shortest line between the axes of hinge movement between said segments and levers, which is toward the axis of the driving shaft, said trunnion providing a shifting fulcrum for said levers, said driving shaft plate being formed eccentrically with a projection extending between said levers, with play, intermediate the free trunnion and the axis of said driving shaft, for selectively swinging either of said levers, depending upon the direction in which said driving shaft is turned, so as to shift said free trunnion further from said shortest line between said axes of hinge movement, a driven shaft, a plate on said driven shaft within said casing, said plate having a projection with recess formed with radial walls, embracing said levers, said walls selectively engaging one or the other of said levers, depending upon the direction in which it is attempted to turn said driven shaft, swinging said levers slightly, so as to move said free trunnion toward said shortest line between said axes of hinge movement, exerting a toggle action which binds said segments against said bearing surface, immobilizing said driving shaft.

2. Irreversible bi-directional transmission device as claimed in claim 1, the hinge connections between said segments and between said segments and levers being constituted by free trunnions suitably received in curved bearing surfaces formed on said segments and said levers.

3. Irreversible bi-directional transmission device as claimed in claim 1, the segments being formed with recesses upon those faces in contact with the driving shaft plate, and the latter being formed with studs received in said recesses for limiting the amount of displacement of said segments relative to said plate.

4. Irreversible bi-directional transmission mechanism including a fixed clutch element comprising a cylindrical bearing surface, free clutch shoes adapted to bind against said surface, means forming a free toggle joint between said clutch shoes for spreading them into binding engagement with said fixed clutch element, free levers for operating said toggle joint, a driving and a driven shaft, said free elements being rotatable with said driving and driven shafts when said toggle joint is in loose position and means connected respectively with said driving and driven shafts and acting respectively on opposite sides of said free levers.

In testimony whereof I have signed my name to this specification.

RAYMOND PETIT.